US 8,615,114 B2

(12) United States Patent
Mizushima et al.

(10) Patent No.: US 8,615,114 B2
(45) Date of Patent: Dec. 24, 2013

(54) IMAGE READING APPARATUS AND IMAGE READING METHOD

(75) Inventors: Satoshi Mizushima, Iizuka (JP); Yoshinori Tahara, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 938 days.

(21) Appl. No.: 12/177,923

(22) Filed: Jul. 23, 2008

(65) Prior Publication Data

US 2009/0087043 A1    Apr. 2, 2009

(30) Foreign Application Priority Data

Sep. 27, 2007    (JP) ................................. 2007-250474

(51) Int. Cl.
*G06K 9/00*    (2006.01)
*H04N 1/04*    (2006.01)

(52) U.S. Cl.
USPC .......................................... 382/124; 358/475

(58) Field of Classification Search
USPC .......................................... 382/124; 358/475
See application file for complete search history.

(56) References Cited

U.S. PATENT DOCUMENTS

| | | | |
|---|---|---|---|
| 6,765,610 B1 | 7/2004 | Nakamura | |
| 2003/0025815 A1* | 2/2003 | Hashimoto | 348/296 |
| 2004/0057633 A1* | 3/2004 | Mai et al. | 382/284 |
| 2005/0105785 A1* | 5/2005 | Shigeta | 382/124 |
| 2005/0281475 A1* | 12/2005 | Wilson | 382/254 |

FOREIGN PATENT DOCUMENTS

| | | |
|---|---|---|
| DE | 19958378 A1 | 11/2000 |
| EP | 1278374 A | 1/2003 |
| EP | 1318473 A | 6/2003 |
| JP | 3116950 | 12/2000 |
| JP | 2003-32453 A | 1/2003 |
| JP | 2005-174280 A | 6/2005 |

OTHER PUBLICATIONS

Japanese Office Action dated Oct. 13, 2009 with partial translation.
Extended European Search Report dated Aug. 14, 2009.

* cited by examiner

*Primary Examiner* — Brian Q Le
*Assistant Examiner* — Michael Vanchy, Jr.
(74) *Attorney, Agent, or Firm* — IPUSA, PLLC (57) ABSTRACT

An image reading apparatus is disclosed that includes a light emitting unit that illuminates light on an object; an image capturing device that receives incident light from the object and generates an electrical signal according to the intensity of the received incident light; an object detecting unit that detects the object being positioned close to the image capturing device; a disturbance light intensity determining unit that turns off the light emitting unit when the object detecting unit detects the object being positioned close to the image capturing device, controls the image capturing device to acquire pixel data of a predetermined number of pixels by imaging the object, and determines a disturbance light intensity based on the acquired pixel data; and a light accumulating time setting unit that sets a light accumulating time of the image capturing device based on the disturbance light intensity determined by the disturbance light intensity determining unit.

9 Claims, 10 Drawing Sheets

Output cycle period

100 μsec

IMAGE READING APPARATUS AND IMAGE READING METHOD

BACKGROUND OF THE INVENTION

1. Field of the Invention

The present invention relates to an image reading apparatus having a light emitting unit that is configured to read an image of an object according to the intensity of light reflected from the object. The present invention also relates to an image reading method.

2. Description of the Related Art

An image reading apparatus that reads a fingerprint image of a finger swiped over a linear fingerprint sensor in a substantially perpendicular direction with respect to the length direction of the fingerprint sensor is known. In such an image reading apparatus, the fingerprint sensor uses an image capturing device that is configured to receive light and output an electrical signal according to the intensity of the received light. Such an image capturing device is configured to acquire a fingerprint image in accordance with a predetermined light accumulating time when a finger is detected to be close to or in contact with the fingerprint sensor.

Figure 1A:
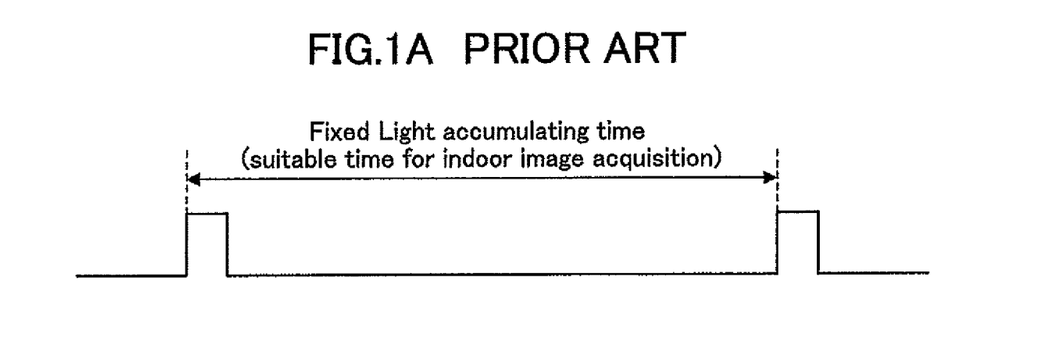
FIG. 1A is a diagram illustrating the light accumulating time of an image capturing device of a conventional image reading apparatus.
Figure 1B:
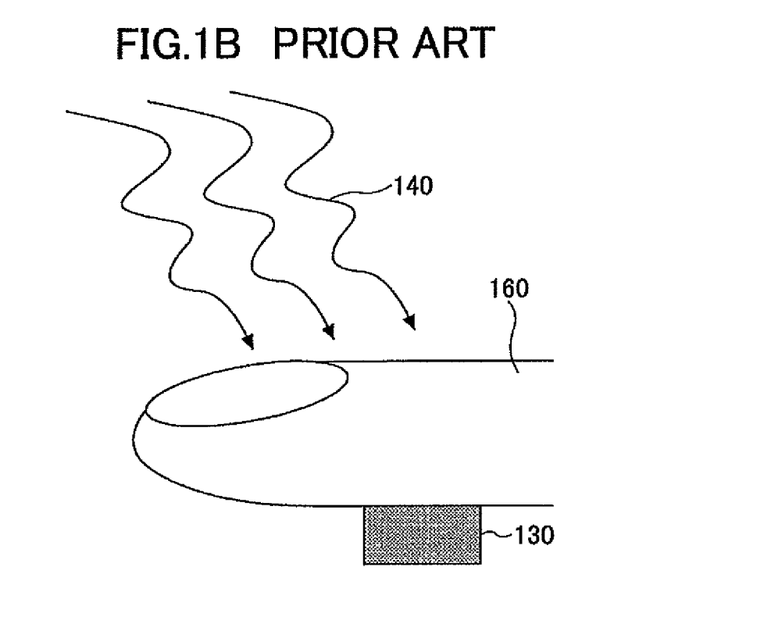
FIG. 1B is a diagram illustrating a fingerprint sensor of the conventional image reading apparatus capturing a fingerprint image of a finger.
Figure 1C:
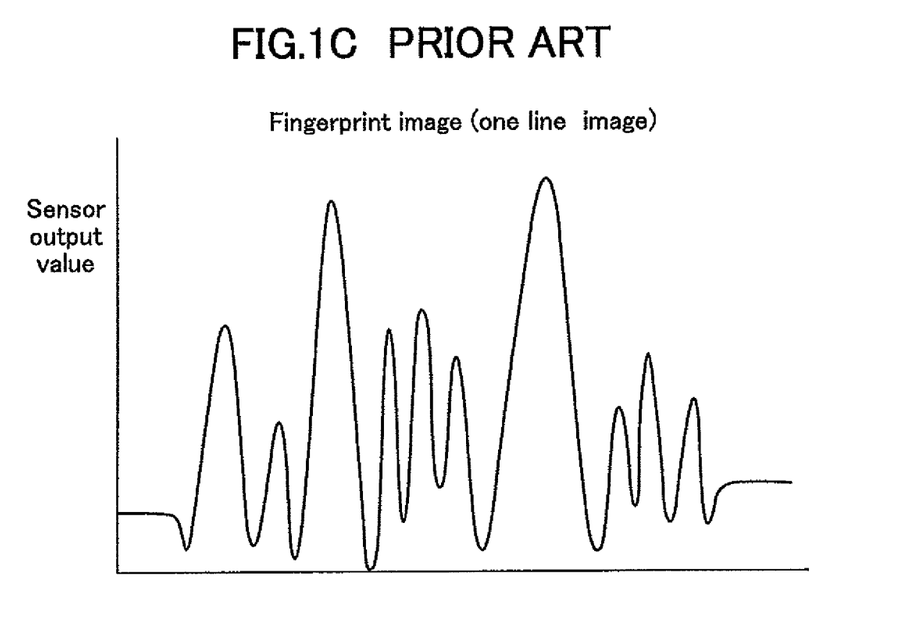
FIG. 1C is a graph representing pixel data values of the fingerprint image acquired under the conditions illustrated in FIG. 1B.

FIGS. 1A-1C are diagrams illustrating a case of reading a fingerprint image using a conventional image reading apparatus. Specifically, FIG. 1A is a diagram illustrating the light accumulating time of an image capturing device of the conventional image reading apparatus. In FIG. 1A, the light accumulating time of the image capturing device is fixed beforehand under the assumption that the fingerprint image is to be acquired indoors or in an environment where influences of disturbance light are minimal or virtually nonexistent.

FIG. 1B is a diagram illustrating a fingerprint sensor 130 having a built-in image capturing device that is acquiring a fingerprint image of a finger 160 being swiped over the finger print sensor 130. In the exemplary case illustrated in FIG. 1B, fingerprint image reading operations are performed indoors where disturbance light 140 is relatively weak and influences of the disturbance light 140 on the image reading operations are minimal.

FIG. 1C is a graph representing pixel data values of a fingerprint image acquired under the conditions illustrated in FIG. 1B. Specifically, FIG. 1C shows pixel data values acquired in a case where the image capturing device is a line sensor that has photoelectric converting elements arranged in one line. In the present case, differences in the ridges and valleys of the fingerprint are clearly represented by the sensor outputs (pixel data values) so that a fingerprint image clearly distinguishing the ridges and valleys of the fingerprint may be acquired.

As can be appreciated from the above descriptions, when the light accumulating time of an image capturing device is set to the time required for the image capturing device to adequately capture an image indoors, a clear fingerprint image may be acquired in an environment where influences of disturbance light are minimal or virtually nonexistent.

It is noted that Japanese Patent No. 3116950 discloses a sensitivity adjusting apparatus for a photo sensor system that includes a photo sensor array having photo sensors with double gate thin film transistors having photo sensing functions and selection transistor functions arranged into a two-dimensional array as an image capturing device. The disclosed apparatus is configured to perform pre-reading operations by varying the image reading sensitivity of the photo sensor array to different levels before reading an image of an object with the photo sensor array, extracting a maximum value and a minimum value of a specific measurement related to an image pattern at each image reading sensitivity level, calculating a measurement data range for each sensitivity level based on the extracted values, extracting the image reading sensitivity level with the maximum data range, and setting the extracted image reading sensitivity as the appropriate image reading sensitivity level for performing actual image reading operations.

However, in the case of using the conventional image reading apparatus as is described above in relation to FIGS. 1A-1C, when a fingerprint image is acquired under an environment where disturbance light is relatively strong, such as under direct sunlight, too much light may be accumulated at the fingerprint sensor 130 so that its pixel data output may be saturated and the ridges and valleys of the fingerprint in the resulting fingerprint image may not be easily distinguished. In such a case, the acquired fingerprint image may not be suitably used for fingerprint authentication.

Figure 2A:
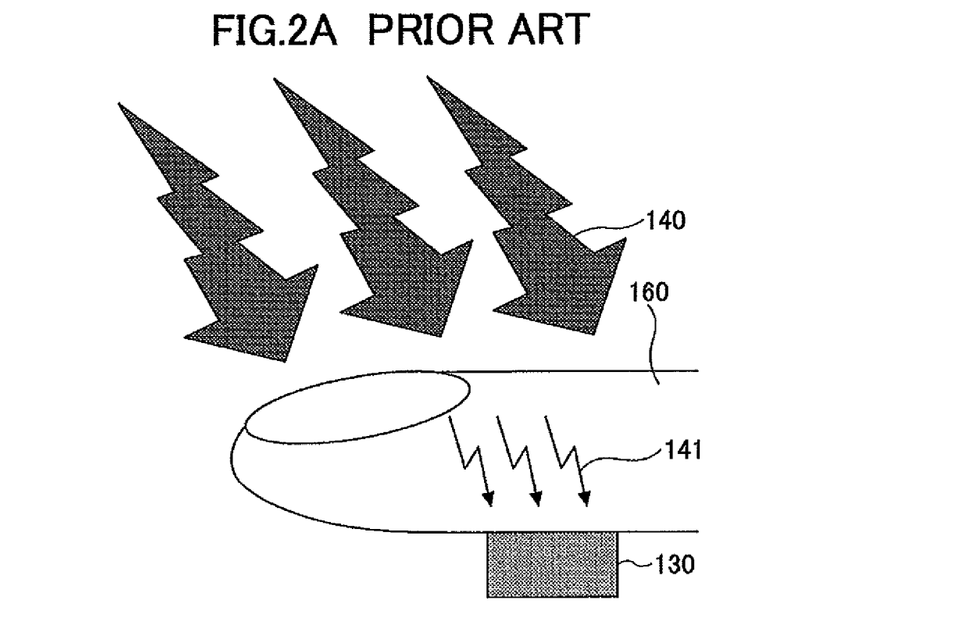
FIG. 2A is a diagram illustrating the fingerprint sensor of the conventional image reading apparatus capturing a fingerprint image of a finger under strong disturbance light.
Figure 2B:
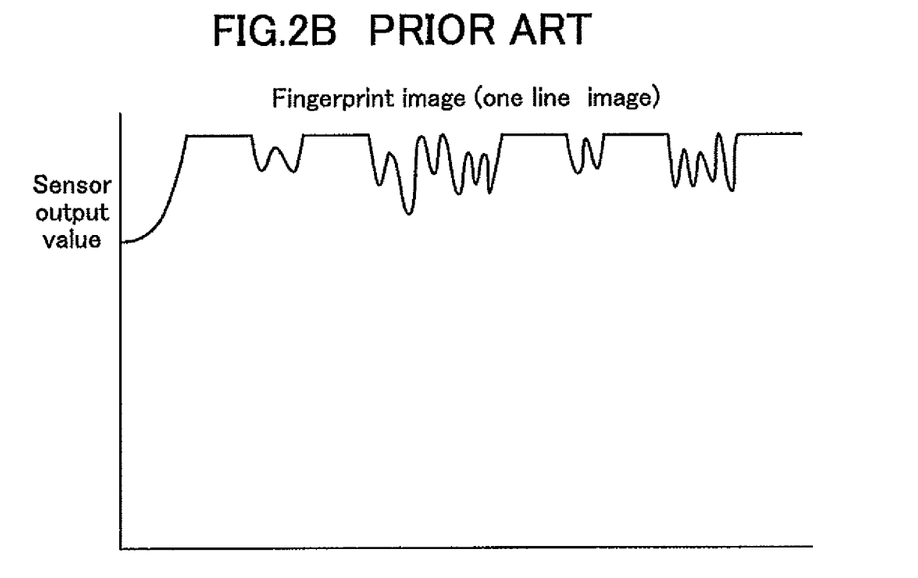
FIG. 2B is a graph representing pixel data values of the fingerprint image acquired under the conditions illustrated in FIG. 2A.

FIGS. 2A and 2B are diagrams illustrating a case of reading an image with the conventional image reading apparatus under an environment where disturbance light 140 is relatively strong. Specifically, FIG. 2A is a diagram illustrating the fingerprint sensor 130 performing image reading operations on a finger 160 that is swiped over the fingerprint sensor 130 under an environment where disturbance light 140 is strong. In the exemplary case illustrated in FIG. 2A where the finger 160 is swiped over the fingerprint sensor 130 under an environment where disturbance light 140 is strong, such as under direct sunlight, transmitted light 141 of the disturbance light 140 may penetrate through the finger 160 to reach the fingerprint sensor 130.

FIG. 2B is a graph indicating pixel data values of a fingerprint image acquired by the fingerprint sensor 130 upon performing image reading operations under strong disturbance light as in the case of FIG. 2A. In FIG. 2B, the output pixel data are saturated so that most of the output pixel data values are close to the maximum output value and the ridges and valleys of the fingerprint cannot be easily distinguished in the resulting fingerprint image.

It is noted that the apparatus disclosed in the above-cited Japanese Patent No. 3116950 may be rather costly because it uses photo sensors with double gate thin film transistors having photo sensing functions and selection transistor functions as the image capturing device. Also, a large number of processes are required for setting the image reading sensitivity in this apparatus because pre-reading operations that are substantially similar to actual image reading operations have to be performed for setting the image reading sensitivity.

SUMMARY OF THE INVENTION

An aspect of the present invention is directed to providing an image reading apparatus with a simple structure that is configured to set the light accumulating time of an image capturing device during normal image reading operations and is capable of acquiring a clear image with adequate contrast even under an environment where disturbance light is strong, such as under direct sunlight. Another aspect of the present invention is directed to providing an image reading method that is implemented in such an image reading apparatus.

According to an embodiment of the present invention, an image reading apparatus is provided that includes:

a light emitting unit that illuminates light on an object;

an image capturing device that receives incident light from the object and generates an electrical signal according to the intensity of the received incident light;

an object detecting unit that detects the object being positioned close to the image capturing device;

a disturbance light intensity determining unit that turns off the light emitting unit when the object detecting unit detects the object being positioned close to the image capturing device, controls the image capturing device to acquire pixel data of a predetermined number of pixels by imaging the object, and determines a disturbance light intensity based on the acquired pixel data; and a light accumulating time setting unit that sets a light accumulating time of the image capturing device based on the disturbance light intensity determined by the disturbance light intensity determining unit.

According to another embodiment of the present invention, an image reading method is provided that includes the steps of:

detecting an object being positioned close to an image capturing device;

acquiring pixel data of a predetermined number of pixels by turning off a light emitting unit and imaging the object using the image capturing device;

determining a disturbance light intensity based on the acquired pixel data;

setting a light accumulating time of the image capturing device based on the determined disturbance light intensity; and imaging the object using the image capturing device in accordance with the set light accumulating time.

DETAILED DESCRIPTION OF THE PREFERRED EMBODIMENTS

In the following, preferred embodiments of the present invention are described with reference to the accompanying drawings.

Figure 3:
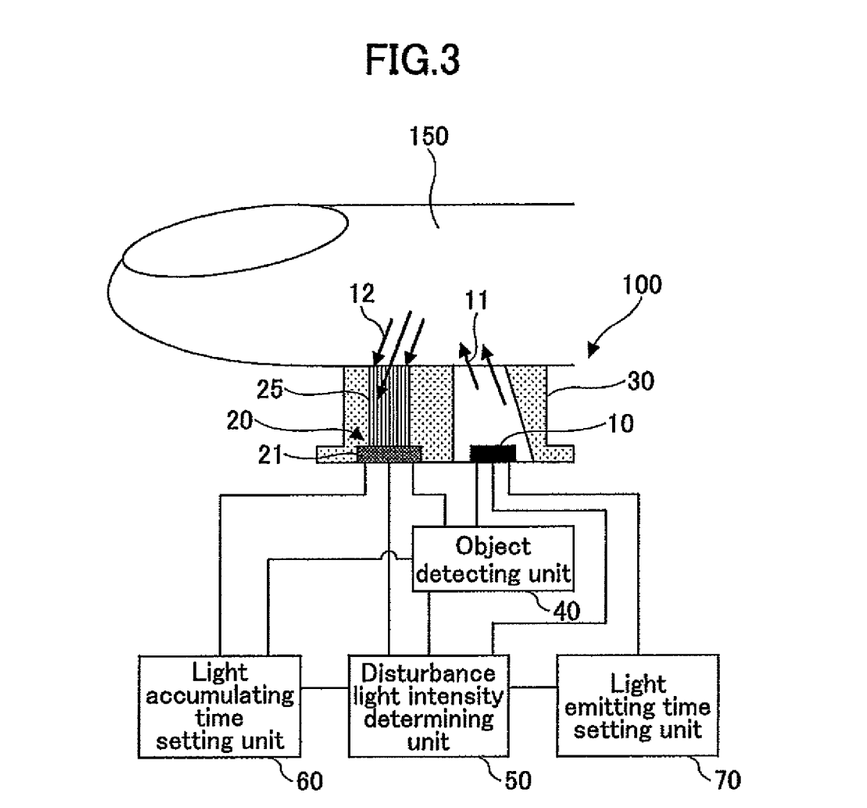
FIG. 3 is a diagram showing an image reading apparatus according to an embodiment of the present invention.

FIG. 3 is a diagram showing an image reading apparatus 100 according to an embodiment of the present invention. The image reading apparatus 100 illustrated in FIG. 3 includes a light emitting unit 10, an image capturing device 20, an object detecting unit 40, a disturbance light intensity determining unit 50, and a light accumulating time setting unit 60. Also, the image reading apparatus 100 may include an image guide 25, a housing 30, and/or a light emitting time setting unit 70, as is necessary or desired.

The light emitting unit 10 is configured to illuminate light on an object 150. The light emitting unit 10 may use an infrared LED (light emitting diode) or some other type of LED or light illuminating device. In the case where the light emitting unit 10 uses the infrared LED, it may be configured to emit infrared rays on the object 150, for example.

The image capturing device 20 is configured to receive light from the object 150 and output an electrical signal according to the intensity of the received light (incident light) to capture an image of the object 150. The image capturing device 20 may have plural pixels 21 made of photoelectric converting elements arranged in a certain pattern, for example. In this case, each of the pixels 21 may be configured to convert incident light into an electrical signal at a certain voltage according to the intensity of the incident light and output the converted electrical signal, for example. In this way, the intensity of light received by each pixel 21 may be represented as a voltage value so that the tone of each pixel may be represented in an overall image acquired by the image reading operations. It is noted that the pixel data values of the pixels 21 representing voltage values according to incident light may be output values ranging from 0 to 255 so that all tone levels of pixel data may be represented.

In one embodiment, the image capturing device 20 may be a line sensor that has the pixels 21 arranged in a line in the horizontal direction. For example, the line sensor may have one pixel arranged in the vertical direction and have hundreds of pixels, such as 126 pixels, 256 pixels, or 512 pixels arranged in the horizontal direction. In the case where the image capturing device 20 uses a line sensor, the entire image of the object 150 may not be read at once by the line sensor. Accordingly, partial images of the object 150 are sequentially acquired by the line sensor when the object 150 moves over the line sensor in a vertical direction (perpendicular direction with respect to the line sensor) and the partial images are composited to acquire a whole image of the object 150. It is noted that the image capturing device 20 may be made up of one single line sensor or plural line sensors.

In another embodiment, the image capturing device 20 may have the pixels 21 arranged into a two-dimensional array. It is noted that various types of photoelectric converting elements may be used as the pixels 21, and in one example, photo diodes may be used as the pixels 21 in which case the image capturing device may be a CCD (charge coupled device) sensor.

As is described above, the image capturing device 20 receives incident light from the object 150. Such incident light may include reflected light of the light that is illuminated on the object 150 by the light emitting unit 10 as well as transmitted light of disturbance light. Specifically, in the case of reading the image of the object 150 in an environment where disturbance light is relatively weak, such as indoors, the reflected light of the light illuminated on the object 150 by the light emitting unit 10 may make up a large portion of the light incident on the image capturing device 20. However, in the case of reading an image of the object 150 under an environment where disturbance light is strong, such as under direct sunlight, transmitted light of the disturbance light that is transmitted through the object 150 is also included in the light incident on the image capturing device 20. In other words, the image capturing device 20 receives light from the object 150 without distinguishing the reflected light from the transmitted light.

It is noted that each of the pixels 21 of the image capturing device 20 may have an open/close unit (not shown) arranged on its surface. The open/close unit may function as a so-called shutter that is opened/closed in accordance with the light accumulating time of the image capturing device 20 for receiving light. Specifically, the open/close unit is opened during the light accumulating time of the image capturing device 20 and is closed at other times (i.e., times other than the light accumulating time of the image capturing device 20). In this way, the light accumulating time of the pixels 21 of the image capturing device 20 may be adjusted.

The image guide 25 may be a path for guiding light from the object 150 to be incident on the image capturing device 20. In one example, the image guide 25 may be a waveguide that uses optical fibers to enable the image capturing device 20 to receive light from the object 150 in an efficient manner. The image guide 25 may be used as is necessary or desired to efficiently guide light from the object 150 to the image capturing device 20.

It is noted that in the illustrated example of FIG. 3, a finger is shown as the object 150 to be imaged. In this case, a fingerprint image of the finger as the object 150 may be read by the image reading apparatus 100. In the following, an exemplary case is described in which the image reading apparatus 100 according to the present embodiment is used as a fingerprint image reading apparatus. However, the present invention is not limited to such an example, and the image reading apparatus 100 may equally be used in cases where the object 150 corresponds to some other living body or physical body. In other words, the image reading apparatus 100 according to the present embodiment may be used for reading images of objects 150 in various forms, provided that the image capturing device 20 is able to detect incident light from the object 150 that is positioned close to or in contact with the image capturing device 20.

The housing 30 accommodates the light emitting unit 10, the image capturing device 20, and the image guide 25, for example, and defines the exterior of the image reading apparatus 100. In a preferred embodiment, the upper portion of the housing 30 may be made of transparent material such as glass. Also, in the case where the object 150 to be imaged corresponds to a finger, the light emitting unit 10 accommodated inside the housing 30 may illuminate light on the surface of the finger being placed on the upper portion of the housing 30 when the finger is swiped over the housing 30, and the image capturing device 20 may receive light from the upper portion of the housing 30 to capture a fingerprint image of the finger.

The object detecting unit 40 is configured to detect the object 150 coming close to the image capturing device 20. The object detecting unit 40 is connected to the light emitting unit 10 and the image capturing device 20 and is configured to control the light emitting unit 10 to be turned on/off in addition to detecting the object 150 coming close to the image capturing device 20 based on pixel data from the image capturing device 20. It is noted that the object detecting unit 40 detects the object 150 coming close to the image capturing device 20 based on pixel data from the image capturing device 20 when the light emitting unit 10 is turned on and pixel data from the image capturing device 20 when the light emitting unit 10 is turned off. The object detecting unit 40 may be a processor that includes a microprocessor and/or predetermined electronic circuits that are configured to perform computational processes for detecting the object 150 based on the pixel data from the image capturing device 20, for example.

The disturbance light intensity determining unit 50 is a processor that is configured to determine the disturbance light intensity. The disturbance light intensity determining unit 50 is connected to the object detecting unit 40 and determines the disturbance light intensity when the object detecting unit 40 detects the object 150 being positioned close to the image capturing device 20. It is noted that the disturbance light intensity is determined after the object 150 comes close to the image capturing device 20 because the disturbance light intensity is determined in order to set optimal conditions for imaging the object 150. In other words, there is no point in determining the disturbance light intensity without the object 150 being properly placed in a position at which it can be imaged by the image capturing device 20.

Also, the disturbance light intensity determining unit 50 is connected to the light emitting unit 10 and the image capturing device 20 so that it may control the light emitting unit 10 to be turned on/off and determine the disturbance light intensity based on pixel data acquired by the image capturing device 20. In the disturbance light intensity determination process, the range in which the current disturbance light intensity belongs is determined in order to determine the appropriate disturbance light intensity mode. It is noted that specific computational processes involved in the disturbance light intensity determination are described in detail below.

The light accumulating time setting unit 60 is configured to set the light accumulating time of the pixels 21 of the image capturing device 20 based on the disturbance light intensity determined by the disturbance light intensity determining unit 50. For example, corresponding light accumulating times for different disturbance light intensity modes may be designated beforehand, and the light accumulating time setting unit 60 may select an appropriate light accumulating time according to the disturbance light intensity mode determined by the disturbance light intensity determining unit 50. It is noted that the light accumulating time setting unit 60 is connected to the object detecting unit 40 so that it may set the light accumulating time of the image capturing device 20 when the object detecting unit 40 detects the object 150 positioned close to the image capturing device 20. The open/close units of the pixels 21 of the image capturing device 20 are opened/closed according to the light accumulating time set by the light accumulating time setting unit 60.

The light emitting time setting unit 70 is configured to set the light emitting time of the light emitting unit 10 to a suitable time for reading the image of the object 150 based on the disturbance light intensity determined by the disturbance light intensity determining unit 50. It is noted that the light emitting time setting unit 70 may be included in the image reading apparatus 100 as is necessary or desired in order to set the light emitting time of the light emitting unit 10 in accordance with the disturbance light intensity.

In an alternative embodiment, the image reading apparatus 100 may have means for automatically adjusting the light emitting time of the light emitting unit 10 instead of the light emitting time setting unit 70, for example.

In the following, a detection method implemented by the object detecting unit 40 for detecting the object 150 coming close to the image capturing device 20 is described with reference to FIGS. 4A, 4B, 5A and 5B.

Figure 4A:
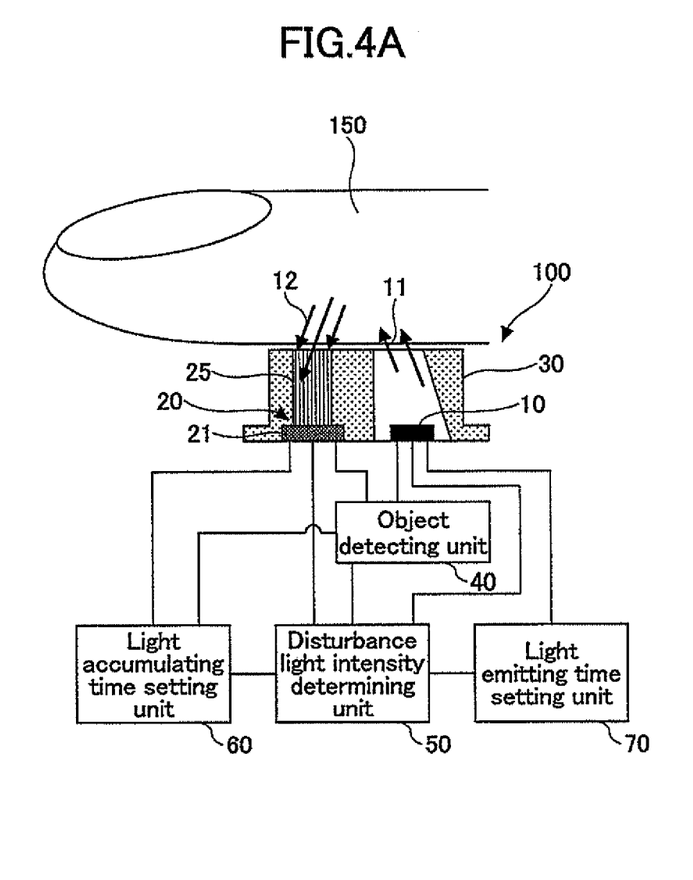
FIGS. 4A and 4B are diagrams respectively illustrating a case in which a light emitting unit is turned on and a case in which the light emitting unit is turned off when an object is positioned close to an image capturing device of the image reading apparatus according to the present embodiment.
Figure 4B:
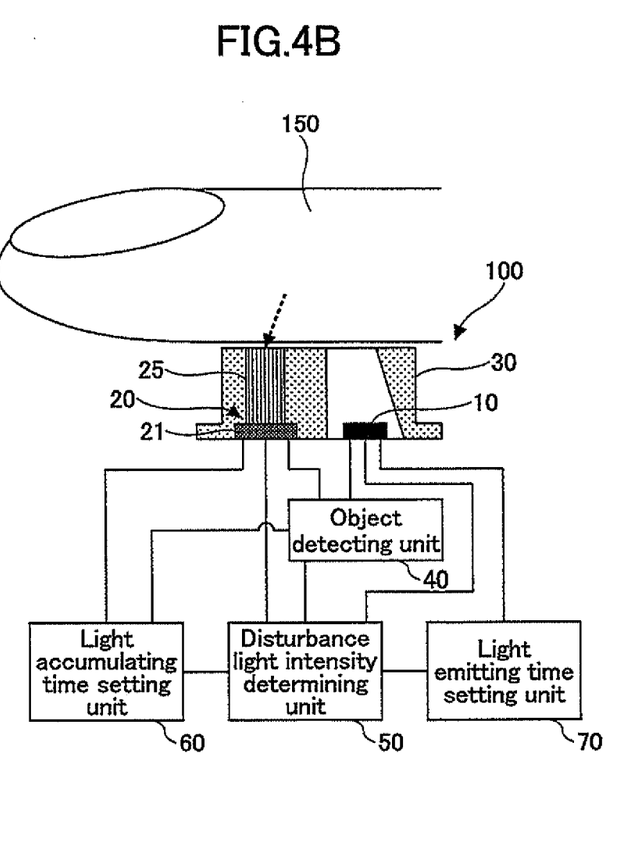

FIGS. 4A and 4B are diagrams illustrating the object 150 being positioned close to the image capturing device 20.

FIG. 4A illustrates a case in which the light emitting unit 10 is turned on when a finger as the object 150 is positioned close to the image capturing device 20. By turning on the light emitting unit 10 when the object 150 is positioned close to the image capturing device 20, light 11 from the light emitting unit 10 may be illuminated on the object 150 and the image capturing device 20 may receive light 12 from the object 150 so that an image of the object 150, namely, a fingerprint image, may be acquired.

FIG. 4B is a diagram illustrating a case in which the light emitting unit 10 is turned off when the object 150 is positioned close to the image capturing device 20. When the light emitting unit 10 is turned off, light may not be illuminated on the object 150 so that the image capturing device 20 may not receive light from the object 150. In this case, the image acquired by the image reading apparatus 100 may be relatively dark.

Figure 5A:
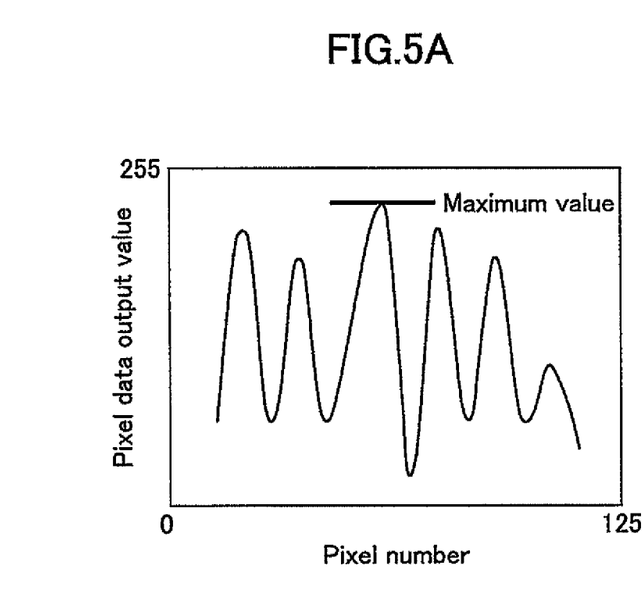
FIGS. 5A and 5B are graphs respectively representing pixel data output values of the object acquired under the conditions illustrated in FIGS. 4A and 4B.
Figure 5B:
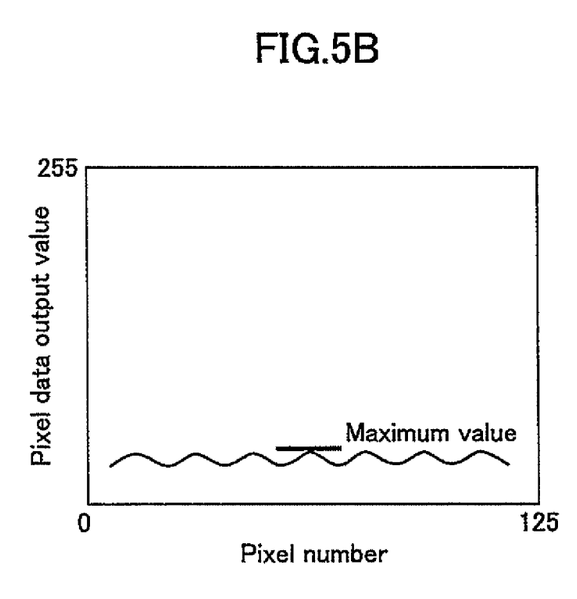

FIGS. 5A and 5B are graphs representing exemplary pixel data outputs of images acquired in the cases illustrated in FIGS. 4A and 4B.

FIG. 5A is a graph indicating pixel data values of an image acquired in the case illustrated in FIG. 4A where the light emitting unit 10 is turned on when the object 150 is positioned close to the image capturing device 20. Specifically, FIG. 5A represents pixel data output values of one line image captured by a line sensor having 126 pixels aligned in the horizontal direction that is used as the image capturing device 20 in the present example. In FIG. 5A, the horizontal axis represents the pixel number of the pixels 21 aligned in the horizontal direction, and the vertical axis represents the pixel data output value of each of the pixels 21. It is noted that the pixels 21 are configured to output pixel data output values ranging from 0 to 255 according to the concavo-convex surface of the object 150, namely, the ridges and valleys of the finger being imaged.

As can be appreciated from FIG. 5A, in the case where an image is acquired when the light emitting unit 10 illuminates light 11 on the object 150 that is positioned close to the image capturing device 20, there may be a relatively wide variation in the pixel data output values of the pixels 21 due to variations in the light 12 incident on the image capturing device 20 according to the concavo-convex pattern of the object 150. It is noted that the brightest pixel data of the pixel data acquired by the image reading operations performed in the case of FIG. 4A may be stored by storing the maximum value of the pixel data output values.

On the other hand, in the case where an image is acquired when the object 150 is not positioned close to the image capturing device 20, environmental light is incident on the image capturing device 20. In this case, the pixel data output values of the pixels 21 may be substantially uniform according to the environmental light and there may not be a wide variation in the pixels of the acquired image.

FIG. 5B is a graph representing exemplary pixel data output values of the object 150 that is imaged in the case where the object 150 is positioned close to the image capturing device 20 and the light emitting unit 10 is turned off. As is described above in relation to FIG. 4B, when the light emitting unit 10 is turned off, the image capturing device 20 does not receive light from the object 150 and the image capturing device 20 is covered by the object 150. Because light is not incident on the image capturing device 20, the pixel data output values of the pixels 21 may be low values that are substantially uniform. In turn, pixel data representing a relatively dark image are acquired.

As is described above, by arranging the light emitting unit 10 to be turned off when the object 150 is positioned closed to the image capturing device 20, the pixel data output values of the pixels 21 may be low values that are substantially uniform. It is noted that the brightest pixel data of the pixel data acquired by the image reading operations performed in the case of FIG. 4B may be stored by storing the maximum value of the pixel data output values.

On the other hand, when the object 150 is not positioned close to the image capturing device 20, environmental light may be incident on the image capturing device 20 even when the light emitting unit 10 is turned off because the image capturing device 20 is not covered by the object 150. Accordingly, the pixel data output values of the pixels 21 may be substantially uniform values according to the environmental light.

As can be appreciated from the above descriptions, in both FIGS. 5A and 5B, pixel data output values may vary depending on whether the object 150 is positioned close to the image capturing device 20. Specifically, in the case where the object 150 is close to the image capturing device 20, the maximum value of the pixel data output values may be relatively large if the light emitting unit 10 is turned on, whereas the maximum value of the pixel data output values may be relatively small if the light emitting unit 10 is turned off. Accordingly, the maximum values of the pixel data output values acquired when the light emitting unit 10 is turned on and off may be compared, and the object 150 may be determined to be positioned close to the image capturing device 20 when the difference between the maximum values is greater than or equal to a predetermined value.

On the other hand, if the object 150 is not positioned close to the image capturing device 20, environmental light is incident on the image capturing device 20 regardless of whether the light emitting unit 10 is turned on or off. Accordingly, the maximum values of the pixel data output values acquired when the light emitting unit 10 is turned on and off may be substantially the same; that is, the difference in the maximum values may be relatively small.

The object detecting unit 40 is configured to control the light emitting unit 10 to be turned on/off and perform computational processes for comparing the maximum values of the pixel data output values to detect whether the object 150 is positioned close to the image capturing device 20.

It is noted that in the above descriptions, an exemplary case is described in which the object detecting unit 40 detects when the object 150 is positioned close to the image capturing device 20. However, the object detecting unit 40 may also detect when the object 150 comes into contact with the image capturing device 20. In such a case, the difference in the maximum values of the pixel data output values may be even greater than the case in which the object 150 is merely positioned close to the image capturing device 20 so that detection of the object 150 may be easier.

In the following, control and computational operations involved in the disturbance light intensity determination process performed by the disturbance light intensity determining unit 50 and the light accumulating time setting unit 60 are described with reference to FIGS. 6-8.

Figure 6:
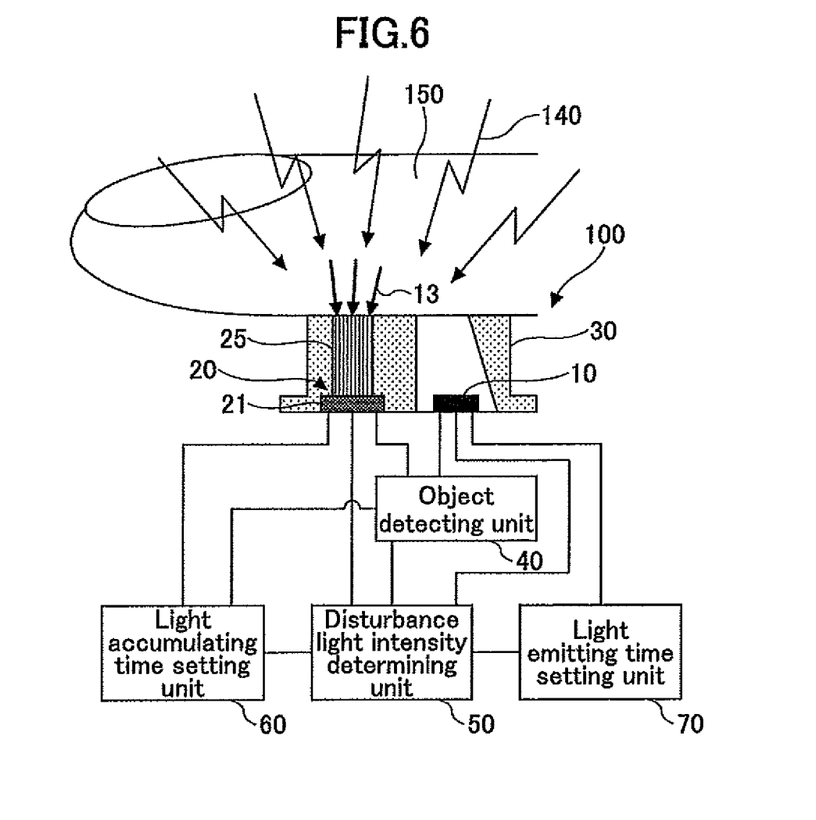
FIG. 6 is a diagram illustrating the image reading apparatus of the present embodiment acquiring pixel data to be used for disturbance light intensity determination.

FIG. 6 is a diagram illustrating the image reading apparatus 100 acquiring pixel data for determining the disturbance light intensity. In FIG. 6, the light emitting unit 10 is turned off while the image capturing device 20 acquires an image of the object 150. In this case, although incident light 12 corresponding to light 11 from the light emitting unit 10 is not generated because the light emitting unit 10 is turned off, transmitted light 13 of disturbance light 140 from the surrounding environment may penetrate through the object 150. In turn, the image capturing device 20 may receive the transmitted light 130 corresponding to the disturbance light 140 penetrating through the object 150.

To determine the disturbance light intensity, the actual influences of the disturbance light 140 on the image reading operations have to be determined. Accordingly, when the object 150 is detected close to the image capturing device 20, the disturbance light intensity detecting unit 50 turns off the light emitting unit 10 so that pixel data of the object 150 that is not illuminated by light may be acquired.

In a preferred embodiment, the pixel data to be acquired when the light emitting unit 10 is turned off may be pixel data of a predetermined number of pixels required for adequately determining the disturbance light intensity. It is noted that operations such as swiping of the object 150 for enabling image reading of the object 150 is expected to be started soon after the object 150 is detected close to the image capturing device 20. Accordingly, the predetermined number of pixels of the pixel data to be acquired with the light emitting unit 10 turned off is preferably small enough so that important or desired areas of the object 150 to be imaged may not be reduced. For example, in a case where the image capturing device 20 is a two-line sensor having 126 pixels aligned in each line, pixel data of the first ten frames may be used for disturbance light intensity determination. In the case where the pixel data to be used for disturbance light intensity determination correspond to ten frames, pixel data of 2520 pixels (i.e., 126×2×10=2520) are to be used for disturbance light intensity determination. It is noted that the number of pixels of data required for disturbance light intensity determination may vary depending on the application and mode of the image capturing device 20 and a suitable number may be set accordingly.

Figure 7:
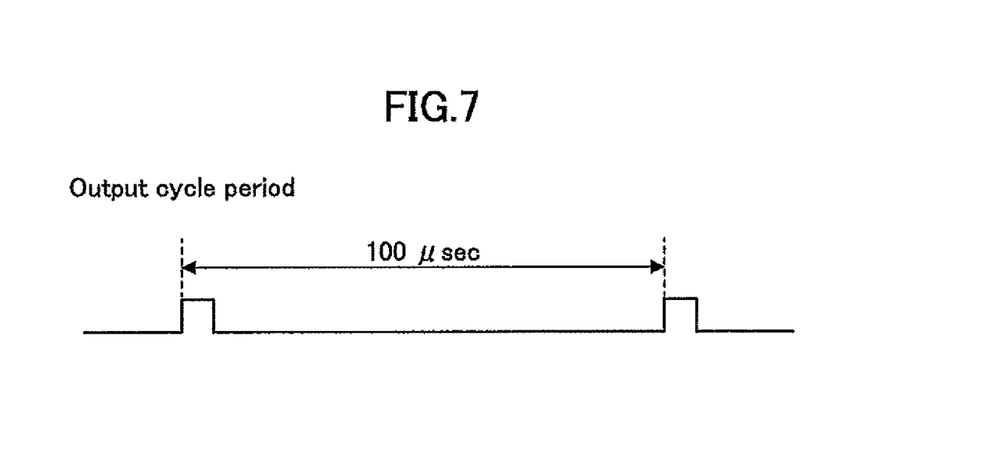
FIG. 7 is a diagram illustrating a light accumulating time setting condition for acquiring the pixel data to be used for disturbance light intensity determination.

FIG. 7 is a diagram illustrating a light accumulating time setting condition for the image capturing device 20 upon acquiring pixel data for disturbance light intensity determination in the manner described. In the case of acquiring pixel data for disturbance light intensity determination, the light accumulating time of the image capturing device 20 is set to its maximum value. For example, in a case where the image capturing device 20 is configured to output acquired pixel data every 100 μsec, the light accumulating time of the image capturing device 20 is set to its maximum value of 100 μsec. In this way, the light accumulating time of the image capturing device 20 receiving transmitted light 13 of the disturbance light 140 may be prevented from being undesirably restricted, and pixel data purely reflecting the transmitted light 13 incident on the image capturing device 20 may be acquired.

It is noted that the light accumulating time setting unit 60 is preferably configured to set the light accumulating time of the image capturing device 20 to its maximum value as soon as the object detecting unit 40 detects that the object 150 is close to (or in contact with) the image capturing device 20. In this way, the light accumulating time of the image capturing device 20 may be set to its maximum value when the disturbance light intensity determining unit 50 acquires pixel data for disturbance light intensity determination.

As is described above, according to one preferred embodiment, the light accumulating time for acquiring pixel data to be used for disturbance light intensity determination is set to the maximum light accumulating time corresponding to the output cycle period of the image capturing device 20. However, in other embodiments, the light accumulating time for acquiring pixel data to be used for disturbance light intensity determination may be set to a predetermined time period for facilitating the disturbance light intensity determination process in consideration of various factors such as the application and mode of the image capturing device 20, for example.

Figure 8:
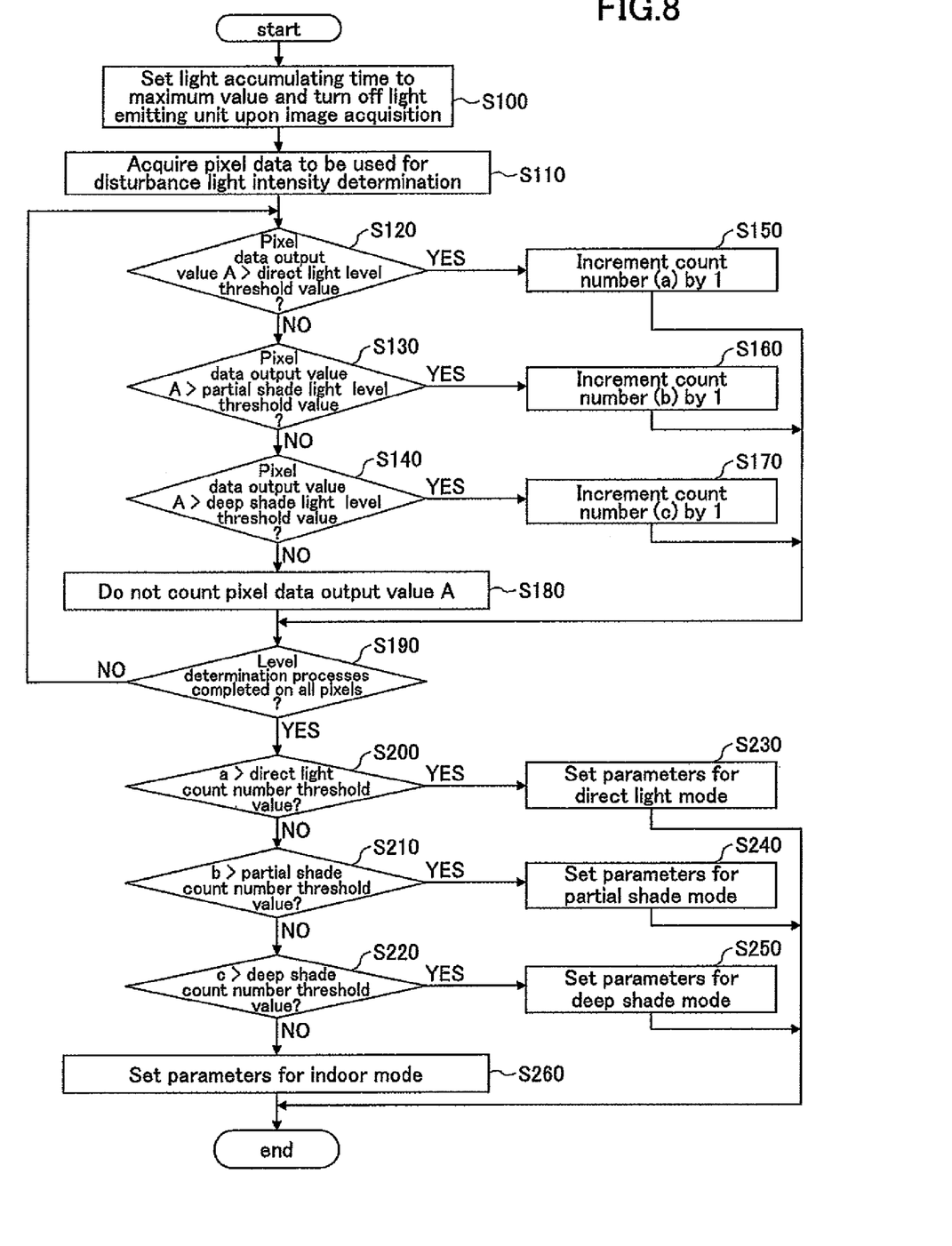
FIG. 8 is a flowchart illustrating determination process steps of a disturbance light intensity determination algorithm.

FIG. 8 is a flowchart illustrating determination process steps of a disturbance light intensity determination algorithm that is executed by the disturbance light intensity determining unit 50 and the light accumulating time setting unit 60.

According to FIG. 8, when the object detecting unit 40 detects that the object 150 is close to the image capturing device 20, the light accumulating time setting unit 60 sets the light accumulating time of the image capturing device 20 to its maximum value, and the disturbance light intensity determining unit 50 turns off the light emitting unit 10 in step S100.

Then, in step S110, image reading operations are performed on the object 150 to acquire pixel data of predetermined pixels to be used for disturbance light intensity determination. For example, in the case where a two-line sensor with each line having 126 pixels arranged in the horizontal direction is used, the predetermined pixels may be 2520 pixels corresponding to ten frames (i.e., 126×2×10=2520). Also, in the case where the object 150 corresponds to a finger, a fingerprint image is captured by the image reading operations. In this case, the image of the tip portion of the finger having clearly defined fingerprint ridges and valleys may be important for authentication purposes, whereas the image of the lower portion close to the root of the finger may be less important compared to the tip portion of the finger. Accordingly, in one preferred embodiment, the importance of imaging areas of the object 150 may be taken into consideration in setting the predetermined pixels to be used for disturbance light intensity determination.

Then, in step S120, pixel data output values A of the pixels 21 acquired in step S110 are each compared with a predetermined direct light level threshold value. The direct light level threshold value may be set to a value of around 100 within the output value range of 0-255, for example. It is noted that the direct light level threshold value may be set to a suitable value according to various factors. When it is determined that the pixel data output value A is greater than the direct light level threshold value, the process moves on to step S150 where an occurrence frequency count number (a) indicating the number of pixels having values within a value range representing the disturbance light intensity at the direct light level is incremented by one. On the other hand, when it is determined that the pixel data output value A does not exceed the direct light level threshold value, the process moves on to step S130.

In step S130, a determination is made as to whether the pixel data output value A is greater than a predetermined partial shade light level threshold value. The partial shade light level threshold value represents a light level that is stronger than that of a full shade and may be set to a value of around 50 within the output value range of 0-255, for example. It is noted that the partial shade light level threshold value may also be adjusted to a suitable value according to various factors such as the application and mode of the image reading apparatus 100. When it is determined that the pixel data output value A is greater than the partial shade light level threshold value, the process moves on to step S160 where an occurrence frequency count number (b) indicating the number of pixels having values within a value range representing the disturbance light intensity at the partial shade light level is incremented by one. On the other hand, when it is determined that the pixel data output value A does not exceed the partial shade light level threshold value, the process moves on to step S140.

In step S140, a determination is made as to whether the pixel data output value A is greater than a predetermined deep shade light level threshold value representing a light level that is weaker than that of a full shade. For example, the deep shade light level threshold value may be set to a value of around 20 within the output value range of 0-255. It is noted that the deep shade light level threshold value may also be adjusted to a suitable value according to various factors such as the application and mode of the image reading apparatus 100. When it is determined that the pixel data output value A is greater than the deep shade light level threshold value, the process moves on to step S170 where an occurrence frequency count number (c) indicating the number of pixels having values within a value range representing the disturbance light intensity at the deep shade light level is incremented by one. On the other hand, when it is determined that the pixel data output value A does not exceed the deep shade light level threshold value, the process moves on to step S180.

In step S180, an appropriate process is performed so that the pixel data output value A that does not exceed the deep shade light level threshold value is not counted. Then, the process moves on to step S190.

In step S190, a determination is made as to whether the determination steps of S120-S180 have been completed on all of the pixel data output values of the predetermined pixels. For example, in the case where the two-line sensor with each line having 126 pixels arrange in the horizontal direction is used as the image capturing device 20, a determination may be made as to whether the process steps of S120-S180 have been performed on all of the 2520 pixels to be used for disturbance light intensity determination. If the process steps of S120-S180 are not yet completed on all of the predetermined pixels 21 to be used for disturbance light intensity determination, the process steps of S120-S180 are repeatedly performed until disturbance light intensity level determination is completed on all of the pixel data output values of the pixels 21.

When it is determined in step S190 that the level determination of the pixel data output values A has been completed for all the predetermined pixels to be used for disturbance light intensity determination, this means that the occurrence frequency distribution of the pixel data of the predetermined pixels has been calculated. In response to a positive determination made in step S190, the process moves on to step S200.

In step S200, a determination is made as to whether the occurrence frequency count number (a) indicating the number of pixels having values within the value range representing the direct light level is greater than a predetermined direct light count number threshold value. The direct light count number threshold value may be set to a value of around 100 within the pixel number range of 0-2520, for example. It is noted that the direct light count number threshold value may be adjusted to a suitable value according to the application and mode of the image reading apparatus 100.

When the occurrence frequency count number (a) indicating the number of pixels having values in the direct light level value range is greater than the predetermined direct light count number threshold value, the process moves on to step S230 in which a determination is made to set the light accumulating time of the image capturing device 20 according to parameters set for direct light mode, and the disturbance light intensity determining unit 50 ends the disturbance light intensity determination process thereafter. In response to the determination made by the disturbance light intensity determining unit 50, the light accumulating time setting unit 60 sets the light accumulating time of the image capturing device 20 according to the direct light mode parameters. On the other hand, when the occurrence frequency count number (a) indicating the number of pixels having values within the direct light level value range does not exceed the direct light count number threshold value, the process moves on to step S210.

In step S210, a determination is made as to whether the occurrence frequency count number (b) indicating the number of pixels having values within the value range representing the partial shade light level is greater than a predetermined partial shade count number threshold value. The partial shade count number threshold value may be set to a value of around 10 within the pixel number range of 0-2520. It is noted that the partial shade count number threshold value may also be adjusted to a suitable value according to the application and mode of the image reading apparatus 100.

When the occurrence frequency count number (b) indicating the number of pixels having values within the partial shade light level value range is greater than the predetermined partial shade count number threshold value, the process moves on to step S240 in which a determination is made to set the light accumulating time of the image capturing device 20 according to parameters set for partial shade mode, and the disturbance light intensity determining unit 50 ends the disturbance light intensity determination process thereafter. In response to the determination made by the disturbance light intensity determining unit 50, the light accumulating time setting unit 60 sets the light accumulating time of the image capturing device 20 according to the partial shade mode parameters. On the other hand, when the occurrence frequency count number (b) indicating the number of pixels having values within the partial shade light level value range does not exceed the partial shade count number threshold value, the process moves on to step S220.

In step S220, a determination is made as to whether the occurrence frequency count number (c) indicating the number of pixels having values within the value range representing the deep shade light level is greater than a predetermined deep shade count number threshold value. The deep shade count number threshold value may be set to a value of around 0 within the pixel number range of 0-2520. It is noted that the deep shade count number threshold value may also be adjusted to a suitable value according to the application and mode of the image reading apparatus 100.

When the occurrence frequency count number (c) indicating the number of pixels having values within the deep shade light level value range is greater than the predetermined deep shade count number threshold value, the process moves on to step S250 in which a determination is made to set the light accumulating time of the image capturing device 20 according to parameters set for deep shade mode, and the disturbance light intensity determining unit 50 ends the disturbance light intensity determination process thereafter. In response to the determination made by the disturbance light intensity determining unit 50, the light accumulating time setting unit 60 sets the light accumulating time of the image capturing device 20 according to the deep shade mode parameters. On the other hand, when the occurrence frequency count number (c) indicating the number of pixels having values within the deep shade light level value range does not exceed the deep shade count number threshold value, the process moves on to step S260.

In step S260, the disturbance light intensity determining unit 50 determines that the light accumulating time of the image capturing device 20 is to be set according to parameters set for indoor mode and ends the disturbance light intensity determination process thereafter. In response to the determination made by the disturbance light intensity determining unit 50, the light accumulating time determining unit 60 sets the light accumulating time of the image capturing device 20 according to the indoor mode parameters.

As can be appreciated from the above descriptions, in the image reading apparatus 100 and image reading method according embodiments of the present invention, the disturbance light intensity is determined and the light accumulating time of the image capturing device 20 is set according to the disturbance light intensity determination result. In this way, image reading operations may be performed using a suitable light accumulating time that is adjusted according to the disturbance light intensity.

Figure 9:
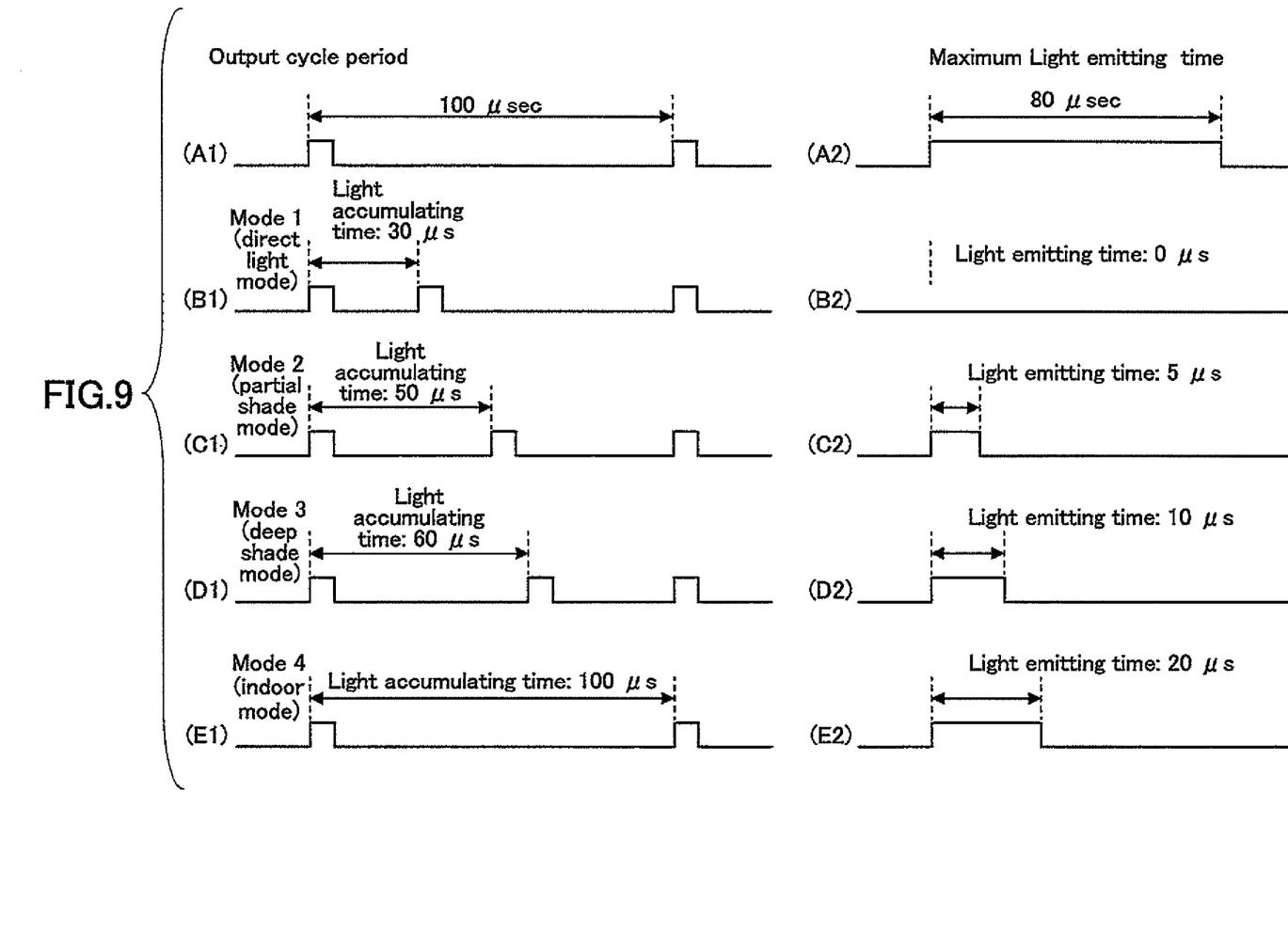
FIG. 9 is a diagram illustrating different parameters set for different modes according to the disturbance light intensity level.

FIG. 9 is a diagram illustrating exemplary parameters for different modes that are set by the light accumulating time setting unit 60 and the light emitting time setting unit 70 according to the disturbance light intensity level. Specifically, timing charts representing exemplary light accumulating times set by the light accumulating time setting unit 60 are shown on the left side of FIG. 9, and timing charts representing exemplary light emitting times set by the light emitting time setting unit 70 are shown on the right side of FIG. 9.

In FIG. 9, timing charts (A1) and (A2) respectively illustrate the pixel data output cycle period of the image capturing device 20 and the maximum light emitting time of the light emitting unit 10. When the pixel data output cycle period of the image capturing device 20 is 100 μsec, the light accumulating time of the image capturing device may be set to 100 μsec at the maximum. It is noted that the light emitting unit 10 is typically not turned on during the entire light accumulating time of the image capturing device 20; that is, the light emitting time of the light emitting unit 10 is generally shorter than the light accumulating time of the image capturing device 20. For example, the light emitting time of the light emitting unit 10 may be set to approximately 80 μsec in the case where the light accumulating time of the image capturing device 20 is 100 μsec.

Timing charts (B1) and (B2) of FIG. 9 respectively represent the light accumulating time and the light emitting time in direct light mode in which the disturbance light intensity is determined to be at the direct light level. In direct light mode, the disturbance light intensity is relatively high so that when the light accumulating time is set to a relatively long time period, the image capturing device 20 may receive a large amount of light and a large portion of the pixel data may reach the maximum output value to cause saturation of the pixel data, for example. Accordingly, in this case, the light accumulating time of the image capturing device 20 is set to 30 μsec, which is 30% of the maximum light accumulating time, and the light emitting time of the light emitting unit 10 is set to 0 μsec. It is noted that the light emitting time of the light emitting unit 10 may be set to 0 μsec in the present case because the amount of transmitted light 13 from the disturbance light 140 may be adequate for reading an image of the object 150.

Timing charts (C1) and (C2) of FIG. 9 respectively represent the light accumulating time and the light emitting time in partial shade mode in which the disturbance light intensity is determined to be at the partial shade light level. In this case, the light accumulating time of the image capturing device 20 is set to 50 μsec, which is longer than the light accumulating time for the direct light mode. Also, the light emitting time of the light emitting unit 10 is set to 5 μsec so that a small amount of light may be emitted from the light emitting unit 10.

Timing charts (D1) and (D2) of FIG. 9 respectively represent the light accumulating time and the light emitting time in deep shade mode in which the disturbance light intensity is determined to be at the deep shade light level. In this case, the light accumulating time of the image capturing device 20 is set to 60 μsec, which is slightly longer than the light accumulating time for the partial shade mode. Also, the light emitting time of the light emitting unit 10 is set to 10 μsec, which is slightly longer than the light emitting time for the partial shade mode.

Timing charts (E1) and (E2) of FIG. 9 respectively represent the light accumulating time and the light emitting time in indoor mode in which the disturbance light intensity level is determined to be at the indoor light level. In this case, influences of disturbance light on image reading operations may be minimal or non-existent so that the light accumulating time of the image capturing device 20 is set to the maximum light accumulating time of 100 μsec. Also, the light emitting time of the light emitting unit 10 is set to 20 μsec. which is slightly longer than the light emitting time for the deep shade mode.

As can be appreciated from the above descriptions, in the image reading apparatus 100 and image reading method according to embodiments of the present invention, the light accumulating time setting unit 60 may set a suitable light accumulating time according to the disturbance light intensity determined by the disturbance light intensity determining unit 50. Also, the light emitting time setting unit 70 may set a suitable light emitting time as is necessary or desired in order to further improve image capturing conditions.

It is noted that FIG. 9 merely illustrates one example of setting parameters according to the disturbance light intensity; however, the present invention is not limited to such an example, and the parameters may be set according to various factors such as application and mode.

Figure 10:
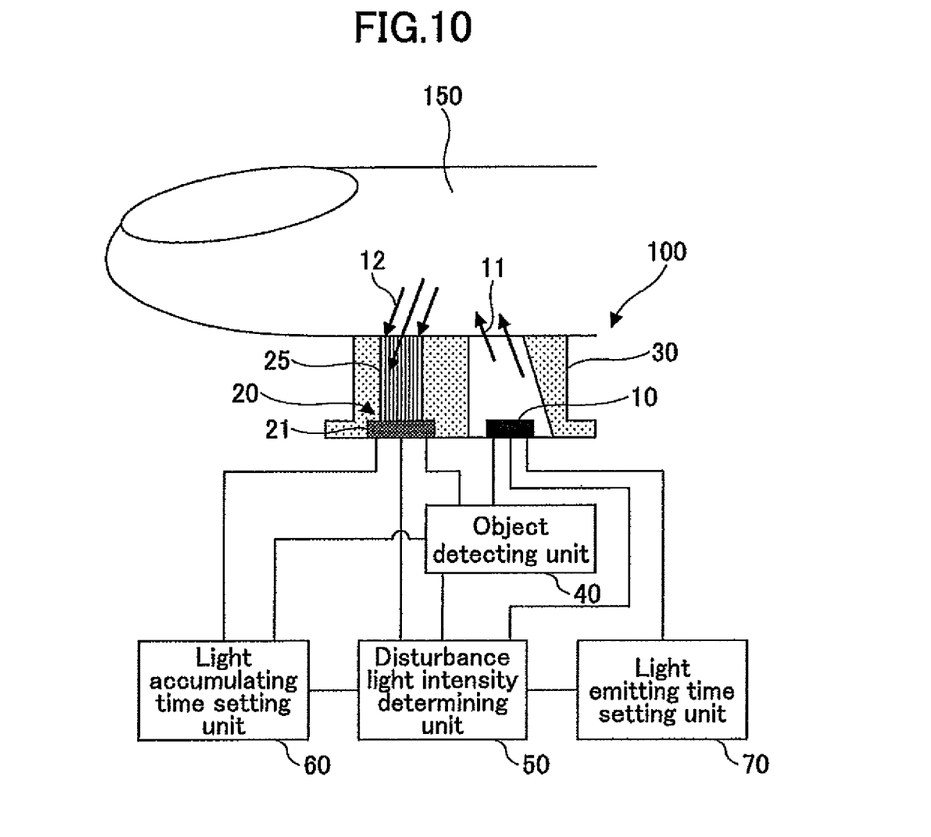
FIG. 10 is a diagram illustrating the image reading apparatus of the present embodiment reading an image of the object after the light accumulating time of the image capturing device is set according to the disturbance light intensity.

FIG. 10 is a diagram illustrating the image capturing device 20 of the image reading apparatus 100 reading an image of the object 150 after the light accumulating time has been set according to the disturbance light intensity. In the image reading apparatus 100 according to the present embodiment, after the light accumulating time of the image capturing device 20 is set according to the disturbance light intensity, the light emitting unit 10 may be turned on as is necessary, and an image of the object 150 may be read by the image reading unit 20 in response to the swiping movement of the object 150, for example. In the illustrated example of FIG. 10, the object 150 corresponding to a finger is swiped over the image capturing device 20 so that a fingerprint image may be acquired from the root portion to the tip portion of the finger. In this case, the light accumulating time of the image capturing device 20 may be set to a suitable value at an initial stage of the finger swiping operation in which the root portion of the finger is being swiped over the image capturing device 20 so that a fingerprint image with clearly defined ridges and valleys may be acquired thereafter.

After setting the light accumulating time of the image capturing device 20, normal image reading operations may be performed by having light 11 from the light emitting unit 10 illuminated on the object 150 and receiving light 12 reflected by the object 150 at the image capturing device 20 to acquire a fingerprint image with clearly defined ridges and valleys.

As can be appreciated from the above descriptions, in the image reading apparatus 100 and image reading method according to embodiments of the present invention, the disturbance light intensity is quickly determined within a normal image reading operation sequence, and the light accumulating time of the image capturing device 20 is adjusted based on this determination result so that a clear fingerprint image may be acquired, for example.

Further, it is noted that although the present invention is described above with respect to specific embodiments, the present invention is not limited to these embodiments and variations and modifications may be made without departing from the scope of the present invention.

The present application is based on and claims the benefit of the earlier filing date of Japanese Patent Application No. 2007-250474 filed on Sep. 27, 2007, the entire contents of which are hereby incorporated by reference.

What is claimed is:

1. An image reading apparatus comprising:
   a light emitting unit that illuminates light on an object;
   an image capturing device that allows the object to cover thereof from above, receives incident light from the object while covered with the object and generates an electrical signal according to an intensity of the received incident light;
   an object detecting unit that detects the object being positioned close to the image capturing device so as to cover the image capturing device;
   a disturbance light intensity determining unit that turns off the light emitting unit when the object detecting unit detects the object being positioned close to the image capturing device, controls the image capturing device to acquire pixel data of a predetermined number of pixels by imaging the object while the light emitting unit is turned off, and determines a disturbance light intensity of transmitted light having transmitted the object and incident on the image capturing device based on the acquired pixel data; and
   a light accumulating time setting unit that sets a light accumulating time of the image capturing device based on the disturbance light intensity determined by the disturbance light intensity determining unit,
   wherein the disturbance light intensity determining unit compares the pixel data with a plurality of predetermined threshold values, sorts the pixel data into a plurality of ranges based on the comparison, calculates an occurrence frequency of each of the ranges, and determines the disturbance light intensity based on the calculated occurrence frequency of each of the ranges, and
   wherein after setting the light accumulating time of the image capturing device to a specified length based on the disturbance light intensity that is determined by the disturbance light intensity determining unit based on the pixel data acquired upon creating a first light condition, an image reading operation using the light accumulating time equal to the specified length is performed upon creating a second light condition different from the first light condition to receive light reflected by the object at the image capturing device, the light emitting unit being turned off in the first light condition, the light emitting unit being turned on in the second light condition, and the image reading operation being performed while the object covers the image capturing device.

2. The image reading apparatus as claimed in claim 1, wherein
   the light accumulating time setting unit sets the light accumulating time of the image capturing device to a maximum value when the object detecting unit detects the object being positioned close to the image capturing device.

3. The image reading apparatus as claimed in claim 1, wherein
   the object is a finger;
   the image capturing device is a line sensor including a plurality of photoelectric converting elements arranged in a line; and
   the pixel data correspond to a predetermined number of line images that are acquired when the finger is swiped over the line sensor.

4. The image reading apparatus as claimed in claim 1, wherein
   the image capturing device acquires an image of the object by imaging the object in accordance with the light accumulating time set by the light accumulating time setting unit.

5. The image reading apparatus as claimed in claim 1, further comprising:
   a light emitting time setting unit that sets a light emitting time of the light emitting unit based on the disturbance light intensity determined by the disturbance light intensity determining unit.

6. An image reading method comprising the steps of:
   detecting an object being positioned close to an image capturing device so as to cover the image capturing device from above;
   acquiring pixel data of a predetermined number of pixels by turning off a light emitting unit and imaging the object using the image capturing device while the light emitting unit is turned off and the image capturing device is covered with the object;
   determining a disturbance light intensity of transmitted light having transmitted the object and incident on the image capturing device based on the acquired pixel data;
   setting a light accumulating time of the image capturing device to a specific length based on the determined disturbance light intensity that is determined based on the pixel data acquired upon creating a first light condition; and
   imaging the object using the image capturing device, using the light accumulating time equal to the specific length, upon creating a second light condition different from the first light condition, the light emitting unit being turned off in the first light condition, and the light emitting unit being turned on in the second light condition,
   wherein the step of determining the disturbance light intensity includes the steps of
   comparing the pixel data with a plurality of predetermined light intensity threshold values, sorting the pixel data into a plurality of ranges based on the comparison, and calculating an occurrence frequency of each of the ranges; and
   comparing the calculated occurrence frequency of each of the ranges with a predetermined frequency threshold value.

7. The image reading method as claimed in claim 6, wherein
   the light accumulating time of the image capturing device is set to a maximum value in the step of acquiring the pixel data.

8. The image reading apparatus as claimed in claim 6, wherein
   the object is a finger;
   the image capturing device is a line sensor including a plurality of photoelectric converting elements arranged in a line; and
   the pixel data correspond to a predetermined number of line images that are acquired when the finger is swiped over the line sensor.

9. The image reading method as claimed in claim 6, further comprising a step of setting a light emitting time of the light emitting unit based on the determined disturbance light intensity.

\* \* \* \* \*